United States Patent [19]

Brown

[11] Patent Number: 5,824,745
[45] Date of Patent: Oct. 20, 1998

[54] RESIN COMPOSITION

[76] Inventor: William F. Brown, P.O. Box 1360, Columbus, Ind. 47202

[21] Appl. No.: 810,678

[22] Filed: Feb. 28, 1997

[51] Int. Cl.$^6$ ........................................... C08F 8/30
[52] U.S. Cl. ................... 525/178; 521/40; 521/40.5; 521/42; 521/45.5; 521/46; 521/49.8; 525/183; 525/184; 525/540
[58] Field of Search ................. 521/40, 40.5, 42, 521/45.5, 46, 49.8; 525/178, 183, 184, 540

[56] References Cited

U.S. PATENT DOCUMENTS

| | | |
|---|---|---|
| 4,018,722 | 4/1977 | Baker . |
| 5,143,308 | 9/1992 | Hally et al. . |
| 5,278,272 | 1/1994 | Lai et al. . |
| 5,503,788 | 4/1996 | Lazareck et al. . |
| 5,554,657 | 9/1996 | Brownscombe et al. ................. 521/46 |

*Primary Examiner*—John M. Cooney, Jr.
*Attorney, Agent, or Firm*—McDonnel Boehnen Hulbert & Berghoff

[57] ABSTRACT

Post consumer recyclable plastics are combined with a ethylene-octene copolymer and a polyamide to prepare a resin composition that can be used in conventional molding processes to fabricate new and useful plastic articles of manufacture.

9 Claims, No Drawings

RESIN COMPOSITION

FIELD OF THE INVENTION

This invention relates to a fluxing composition which allows post consumer recyclable plastics (PCR) to be formulated and processed into new plastic articles of manufacture. The fluxing composition is an admixture of PCR, an ethylene-octene copolymer and a polyamide.

BACKGROUND OF THE INVENTION

The plastics industry has brought into use a broad and varied range of materials which are employed in nearly every major industry including the electrical, automotive, steel, railway, food packaging, printing and textile industry. This wide use of plastics has resulted because of the flexibility, strength, resistance to water and acids, lightweight and low-cost properties of these materials, and also because of the many ways in which it may be worked or fabricated including, inter alia, molding, extrusion, laminating, casting and calendering. However, because plastics resist rust, rot and breakdown into their natural forms, the disposal of worn-out plastic materials has become a challenging problem. My invention addresses this problem.

Plastics are a family of synthetic materials composed of extremely large molecules called polymers, which are synthesized from smaller molecules called monomers. The overall properties of a plastic are a result of the combined properties of all its molecules, such as their different sizes, their chemical structure and shape, and their ability to crystallize. Furthermore, the properties of plastic materials can be altered by mixing them with additives. Additives are mixed or compounded with a polymer to improve its processing characteristics and produce other desirable properties. The resulting product is then called a compound or resin. "Virgin resin" is a general term that denotes a polymer composition not derived from recycled materials and which typically does not contain additives. Polymers that soften when heated and can be shaped if heat and pressure are applied are called thermoplastics. Polymers that soften and can be shaped only during the first heating cycle, and cannot be reformed, are called thermosetting plastics. Since thermosetting plastics are not easily recycled, this invention is directed primarily to thermoplastics, which represent a majority of all plastics. There exists six major thermoplastics—low-density polyethylene (LDPE), high-density polyethylene (HDPE), polyethylene terephthalate (PET), polypropylene (PP), styrene polymers, and polyvinylchloride (PVC).

The term post consumer recyclables or "PCR" is a term used in the waste collection/treatment industry to denote all scrap plastics that have value and are recyclable, primarily thermoplastics. The recycling of PCR has increased significantly in recent years, especially the recycling of plastic containers made, for example, from HDPE or PET. HDPE has been increasingly recycled back into rigid containers and many injection molding applications. Plastic milk jugs are a major source of recycled HDPE. Although PCR can be recycled, the amount of PCR that can be used has been limited to representing only approximately 30% of the total amount of resin used to fabricate a new article. In other words, PCR has been limited in its application to replacing only 30% of the virgin resin normally used to fabricate new plastic articles.

Prior to my invention as described below, only these very low amounts of PCR could be mixed with virgin resin. This was due primarily to the widely varying nature and quantity of the contaminants normally found in PCR. These contaminants include varying contents of different recycled plastics (i.e., PET, PP, LDPE or PVC) which are found in the bales of recycled plastics received from Material Recycling Facilities (MRFs). These MRFs collect all types of recyclable materials (i.e., glass, plastic, paper, fiber and metal) from local communities and businesses and then sort and bale the materials into the various recycled product streams. Not only do the bales of recycled plastics contain different proportions of the different types of plastics, the average composition of bales from one MRF to another MRF differ.

Typically, before PCR is mixed with virgin resin to formulate a new plastic article of manufacture, it is processed by grinding and washing processes in order to remove certain contaminants. The shredded and washed material is then typically pelletized using standard processing equipment, such as an extrusion process. The washing step can be performed either before or after grinding and is performed to remove contaminants of food or other consumer products that were originally present in the plastic containers or packaging. These contaminants are believed to effect the physical properties of the manufactured articles ultimately made using PCR. Although washings of ground PCR does improve the compatibility of the PCR with virgin resin, those skilled in the art have nevertheless been unable to increase the level of PCR to greater than about 30–40 vol. % of a given PCR/virgin resin charge to a molding operation.

Clearly, it would be of great economic benefit if the level of PCR could be significantly increased. Indeed, a significant advantage would be obtained if new articles of manufacture could be fabricated using 100% PCR (i.e. no virgin resin). As such, a need exists for an effective and economical composition comprising high levels of PCR that will allow manufactured articles to be fabricated using at least 50 wt. % or more PCR. The possibility of using high levels of PCR as a replacement for virgin resin is economically attractive and is a positive benefit to the environment. My invention now allows for replacement of up to all of the virgin resin with PCR.

SUMMARY OF THE INVENTION

According to one embodiment of the invention, a resin composition is provided that will allow a newly manufactured plastic article to be comprised of greater than 50 wt. % PCR. This resin composition preferably includes PCR resin, at least one ethylene-octene copolymer, and at least one polyamide. These components, when admixed, can be used in known manufacturing processes, such as injection molding, extrusion molding, rotomolding and compression molding to fabricate useful products without the need for virgin resin.

Accordingly, one object of this invention is to provide resin a composition having at least 80 wt. % of PCR resin, where the PCR comprises a mixture of 100% recycled thermoplastics and is used to manufacture new and useful articles using conventional methods of molding, casting, extrusion laminating and calendering.

Another object is to provide a composition using only 100 wt. % PCR (i.e., no virgin resin) and at least two additives in a conventional molding process for the manufacture of new products having many, if not all the desirable physical and chemical characteristics of articles made using 100 wt. % virgin resin, including strength, resistance to corrosion by weather, water or chemicals.

Yet another object is to use conventional molding techniques with a composition of PCR, an ethylene-octene copolymer and a polyamide to fabricate containers, especially containers designed to receive residential and commercial waste and recyclable materials. Still another object is to fabricate a molded container from only PCR resin that has the same or superior physical properties as previously known and manufactured containers fabricated using only virgin resin.

A still further object is to provide a method of manufacturing a plastic article using 100 wt. % PCR, an ethylene-octene copolymer and a polyamide.

Further objects and advantages of the invention will become apparent as the following description proceeds and the features of novelty which characterize this invention will be pointed out with particularity in the claims.

DESCRIPTION OF PREFERRED EMBODIMENTS

The resin composition of this invention comprises post consumer recyclables (PCR), an ethylene-octene copolymer and a polyamide. This resin composition can be used alone or in combination with virgin resin in conventional molding processes, such as injection molding, compression molding, blow molding or rotomolding, to produce useful plastic articles of manufacture. Such articles include residential and commercial waste collection containers and carts. The PCR used in the resin composition of this invention is preferably a mixture of shredded and washed thermoplastics. The preferred thermoplastics include high density polyethylene (HPDE) and polyethylene terephthalate (PET). More preferably the PET content is less than 22 wt. % of PCR. Typically, the PCR is collected at a MRF, baled, and delivered to a separate facility that grinds or shreds and washes the PCR. The washed and ground PCR can be pelletized using conventional extruding equipment. Alternatively, the ethylene-octene copolymer and the polyamide can be physically mixed with the ground and washed PCR prior to pelletization. Following this latter approach will produce a homogenous pellet comprising a resin composition of this invention. Although the total amount of PCR used in fabricating the new plastic article of manufacture is not critical, it preferably accounts for greater than 50 wt. % and most preferably greater than 80 wt. % of the total amount of virgin and PCR resin charged to the particular molding process. More preferably the resin composition contains more than 50 wt. % PCR and most preferably greater than 80 wt. %. Varying the amount of PCR is accomplished by adding specific known amounts of virgin resin to the total quantity of resin that is ultimately charged to the molding process. In other words, adding virgin resin works to dilute the amount of the resin composition of this invention, and thus the amount of PCR, that is used in the molding process to fabricate the plastic article. For example, pellets comprising the resin composition of this invention can be fed to one of many molding processes without adding virgin resin. Alternatively, a quantity of virgin resin can be added along with the pellets and the resulting admixture is then fed to a molding process.

In addition, as is well known in the art of fabricating plastic articles of manufacture, other ingredients, such as, ultra-violet light stabilizers, plasticizers or pigments, may be added to the resin composition of this invention prior to its introduction into the molding process. These other ingredients can be added before or after pelletization of the resin composition.

The ethylene-octene copolymer component of the resin composition is a substantially linear elastic olefin polymer.

Examples of such linear polymers are described in U.S. Pat. No. 5,278,272 (Lai et al.), the teachings of which are incorporated herein by reference. Preferably, the linear polymer is one of a variety of saturated ethylene-octene copolymer manufactured and sold by DuPont Dow Elastomers under the brand name Engage™. Typically, these elestomers are used to produce high performance electrical insulation and jacketing for low voltage cable applications. Surprisingly, I have found that when these ethylene-octene linear copolymers are mixed with PCR in weight ratios ranging from about 1:99 to about 2:8, an unexpected synergism occurs that allows 100% PCR (i.e., no virgin resin) to be molded into useful plastic articles having equivalent, and sometimes superior, physical properties than the same article fabricated from 100% virgin resin. Although molded articles made from PCR and the ethylene-octene copolymer alone is possible, a preferred composition has additional benefits that are observed when a polyamide is added to the resin composition. When the ethylene-octene copolymer is mixed with PCR and the polyamide it comprises from about 5 wt. % to about 20 wt. % of the three component resin mixture.

Although I do not know the exact reason for the observed synergism between the PCR and the ethylene-octene copolymer, it does appear that the ethylene-octene copolymer behaves like a glue or fluxing agent that allows the differing recycled thermoplastic polymers in the PCR to bind together into a more homogenous mixture during the molding process.

As mentioned, a third ingredient, a polyamide can be added to the PCR/ethylene-octene resin composition. The polyamide component is preferably a copolyester based on the building block butanedial-1,4. The polyamides are sometimes referred to as hot melt adhesives and can be prepared, for example, by the reaction of adipic acid (hexanedioic acid) with azacyclotridecan-2-one, hexahydro-2 hexanedioic acid. Alternatively, commercially available hot melt adhesives can be used, for example, a preferred such polyamide is sold by Hüls Aktiengesellschaft under the brand name Vestamelt®. The quantity of polyamide used in the resin composition is from about 0.1 to about 5 wt. % of the total resin composition. As with the ethylene-octene polymer, the exact reasons why polyamides enhance the performance of the resin composition are not completely known, however, it is believed that the polyamide works as a lubricant when the resin composition is melted during molding process. This lubrication property works to improve the flow properties of the melted resin during mold filling which is important in producing a uniform molded product. Improved flow properties manifest themselves in the injection molding process as reduced process pressure.

To further illustrate the resin composition of this invention the following example is presented to demonstrate several embodiments of the invention and is not in any way limiting of the scope of the invention.

EXAMPLE

To evaluate the resin compositions of this invention, plastic 96 gallon residential waste collection containers were fabricated using an injection molding process. Shredded and washed mixed colored PCR comprising 100% used and recycled HDPE was dry blended with an ethylene-octene copolymer (Engage™ CL 8003) and a polyamide (VestaMelt® 170/171) to the following compositions (wt. %):

|  | Cart A | Cart B | Cart C |
|---|---|---|---|
| PCR | 100 | 90 | 97.5 |
| Engage ™ | 0 | 8 | 2.2 |
| Vestumelt ® | 0 | 2 | 0.3 |
| Virgin resin | 0 | 0 | 0 |

The dry blend was fed to an extruder to produce a homogenous resin pellet. The resin pellets were then used in an injection molding process to fabricate the 96 gallon waste containers. Virgin resin was not added to any of the resin compositions listed above or to the actual resin charge to the injection molding process. In other words Carts A-C were fabricated without using any virgin resin whatsoever.

The fabricated containers were subjected to physical testing and the results were compared to that of containers fabricated using only virgin resin.

|  | Drop Height[1], ft. | Life[2] |
|---|---|---|
| Cart A | 8.5 | 867 |
| Cart B | 19.4 | 1,595 |
| Cart C | 11 | 1,210 |
| Virgin Resin | 18.6 | 6,600 |

[1]This value is determined from the "drop test" which involves filling a test cart cooled to −20° F. with 160 lbs. of polyethylene pellets, raising the cart to a beginning height of 20 ft. and dropping it. This dropping is repeated at gradually lowering heights until no cart failure is detected. The height reported is that at which the cart does not fail when dropped.
[2]The "life" determined by filling a test cart with 350 lbs. of polyethylene pellets and subjecting it to repeated automated tipping cycles to simulate the actual emptying cycles used in the field. The number reported is the number of tipping cycles performed until cart failure.

As illustrated above, both Carts B and C, made using the resin composition of this invention, tested significantly better than a cart made with PCR alone and very comparable to a cart containing all virgin resin. In addition, Cart A, made with only PCR, without either ethylene-octene copolymer or the polyamide, tested inferior to both the virgin and Carts B and C.

It will be understood that the details given herein are for the purpose of illustration only, not restriction, and that variations within the spirit of the invention are intended to be included in the scope of the following claims.

I claim:

1. A resin composition for use in fabricating a plastic article of manufacture comprising post-consumer recycled plastic materials which contain polyethylene and/or polyethylene terephthalate, an ethylene-octene copolymer and a polyamide.

2. The composition of claim 1 wherein the post-consumer recycled plastic materials comprise greater than 50 wt. % of the resin composition.

3. The composition of claim 1 wherein the post-consumer recycled plastic materials comprise greater than 80 wt. % of the resin composition.

4. The composition of claim 1 wherein the post-consumer recycled plastic materials comprise between 80–95 wt. %, the ethylene-octene copolymer comprises from about 20 to 5 wt. % and the polyamide comprises from about 0.1 to about 5 wt. % of the resin composition.

5. A resin composition for use in fabricating a plastic article of manufacture consisting essentially of post-consumer recycled plastic materials which contain polyethylene and/or polyethylene terephthalate and ethylene-octene copolymer and a polyamide, where the ethylene-octene copolymer comprises from about 5 to about 20 wt. % of the resin composition.

6. A method of manufacturing a plastic article comprising, in combination, the following steps, (a) collecting post consumer recycled plastics which contain polyethylene and/or polyethylene terephthalate;

(b) shredding and washing the recycled plastics;

(c) combining the shredded and washed recycled plastics with an ethylene-octene copolymer and a polyamide to form a resin composition; and (d) processing the resin composition into a plastic article of manufacture.

7. The method of claim 6 wherein the processing of the resin composition is performed by injection molding.

8. The method of claim 6 wherein the processing of the resin composition is performed by compression molding.

9. The method of claim 6 wherein the processing of the resin composition is performed by rotomolding.

* * * * *